L. H. PERLMAN.
RIM.
APPLICATION FILED NOV. 1, 1919.
1,388,196.
Patented Aug. 23, 1921.
2 SHEETS—SHEET 1.
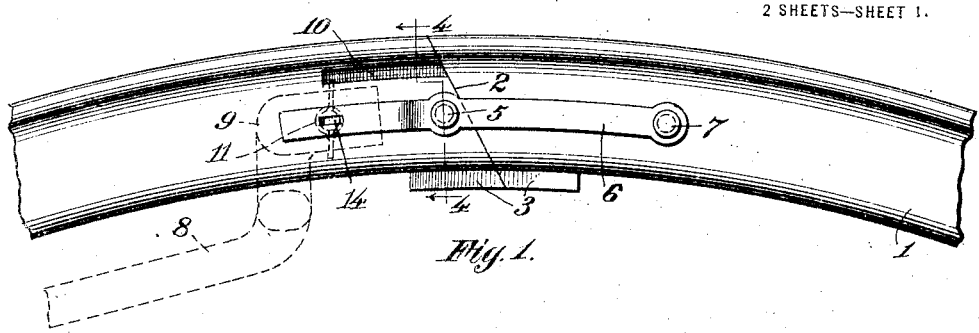
Fig. 1.
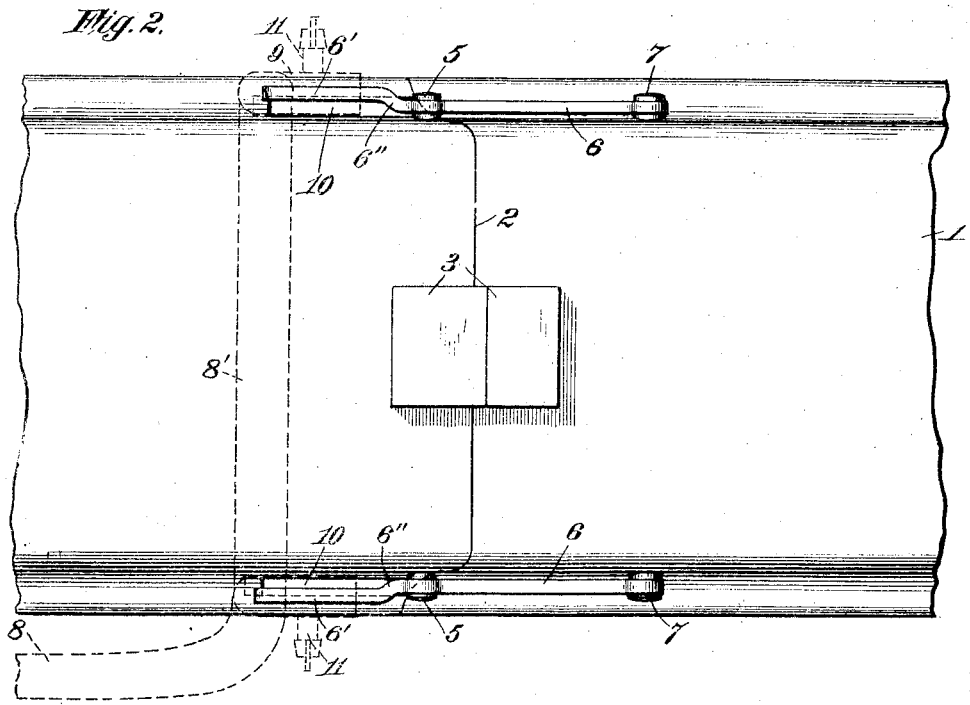
Fig. 2.
Fig. 4.
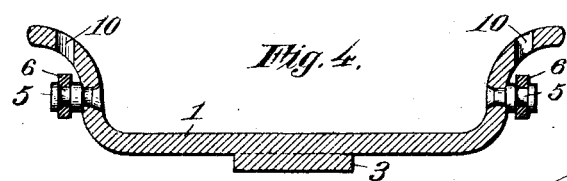
Inventor
Louis H. Perlman,
By Edgar M. Kitchin
his Attorney L. H. PERLMAN.
RIM.
APPLICATION FILED NOV. 1, 1919.
1,388,196.
Patented Aug. 23, 1921.
2 SHEETS—SHEET 2.
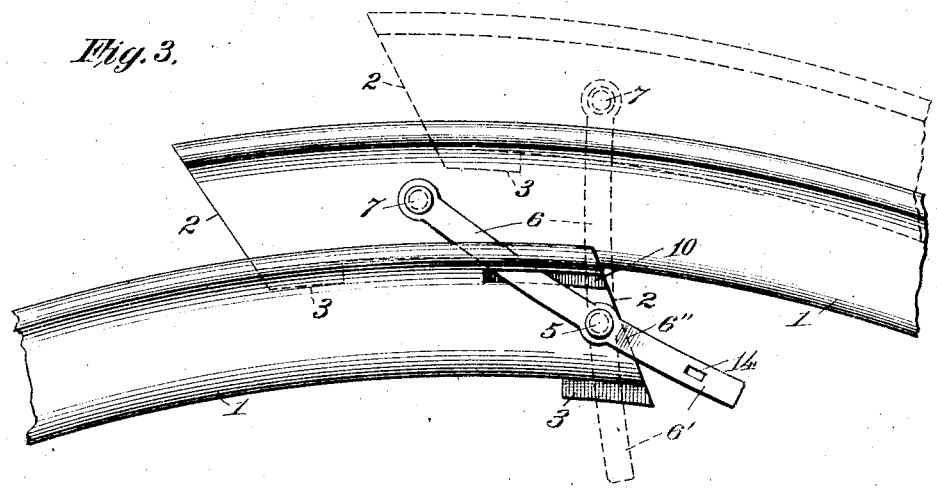
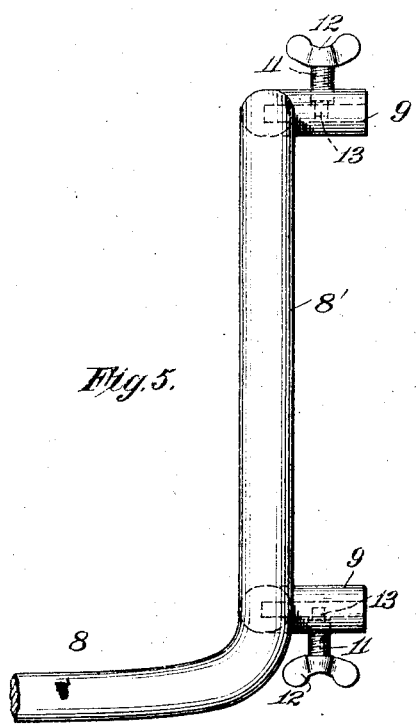
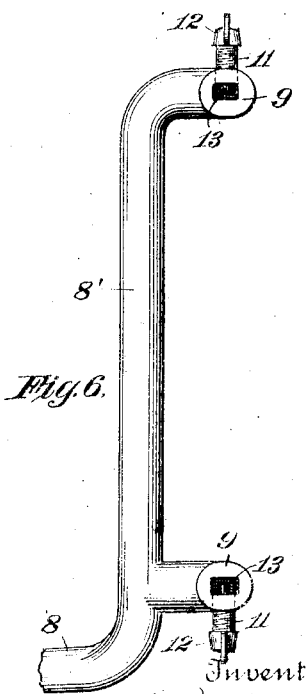
Inventor
Louis H. Perlman,
By Edgar M. Kitchin
his Attorney.

UNITED STATES PATENT OFFICE.

LOUIS H. PERLMAN, OF NEW YORK, N. Y., ASSIGNOR TO GENERAL MOTORS CORPORATION, A CORPORATION OF DELAWARE.

RIM.

1,388,196.   Specification of Letters Patent.   Patented Aug. 23, 1921.

Application filed November 1, 1919. Serial No. 334,919.

*To all whom it may concern:*

Be it known that I, LOUIS H. PERLMAN, a citizen of the United States, residing at New York, in the county of New York and State of New York, have invented certain new and useful Improvements in Rims; and I do hereby declare the following to be a full, clear, and exact description of the invention, such as will enable others skilled in the art to which it appertains to make and use the same.

This invention relates to improvements in demountable rims, and more particularly to the cross-cut type designed for application to and removal from tire shoes or casings by being collapsed or coiled and extended or uncoiled.

The object in view is the provision of means for facilitating the collapsing and uncoiling operations.

With this and further objects in view as will in part hereinafter become apparent and in part be stated, the invention comprises certain novel constructions, combinations and arrangements of parts as subsequently specified and claimed.

In the accompanying drawings,—

Figure 1 is a side view of a fragment of a demountable rim embodying the features of the present invention.

Fig. 2 is an inverted plan thereof.

Fig. 3 is a view similar to Fig. 1 with the parts shown in full lines in the collapsed or coiled position and in dotted lines in the course of moving to or from such position.

Fig. 4 is a transverse section taken on the planes indicated by line 4—4 of Fig. 1, and looking in the direction indicated by the arrows.

Fig. 5 is a plan view of the operating tool, a portion of the handle being broken away.

Fig. 6 is a perspective view of the same.

Fig. 7 is a detail side elevation of one of the locking bolts for the operating tool.

Referring to the drawings by numerals, 1 indicates a demountable rim cross-cut along the line indicated at 2, and having the radially inwardly-extending plates 3, 3 adapted to fit between driver plates on the felly band of an automobile wheel for preventing separation of the ends of the rim under the stresses of the ordinary locking side wedges. The rim 2 is of the conventional, commercial rolled sheet steel type, the invention being indicated as applied to what is known as the straight-side form of demountable rim, but being obviously applicable to any form of demountable rim. The rim 1 is thus formed with a channel having a base and side flanges rounded out to their respective free edges. Adjacent one end of the rim 1, its flanges are provided with laterally outstanding pivots 5, 5, each consisting of a stud anchored to the respective flange. Each of the said studs is preferably anchored by being riveted to the respective flange, but may be otherwise connected if preferred, and each stud is formed with an annular groove serving as the bearing for an operating lever 6, there being an operating lever 6 pivotally engaging each of the pivots 5. Each of the levers 6 is journaled on its respective pivot 5 at a point intermediate its ends, and one portion of each lever extends across the cross-cut 2 and pivotally engages a stud 7 spaced a considerable distance from the cross-cut 2, the distance of the spacing of the stud 7 from the cross-cut 2 being slightly greater than one-half the distance of overlapping of the end portions of the rim when coiled. Each of the levers 6 extends along the respective side flange of rim 1 beneath or radially within the curve of the outer portion of that flange, so that the levers are not exposed to contact with extraneous objects, such as the curbing along streets or the like when the wheels of the vehicle are caused to move sufficiently close to such objects as to cause the exposed edge of one of the flanges to contact therewith. Thus levers 6 are protected. Each lever 6 has a free end portion 6' extending beyond its pivot 5 and preferably offset laterally as indicated at 6" to provide space between itself and the adjacent face of the side flange for the accommodation of an extension socket.

An operating tool 8 is provided for cooperating with an enabling easy manipulation of the levers 6, the said tool 8 consisting of an elongated handle adapted to be disposed outside of the planes of the rim 1 and having a lateral extension 8' from which extend the parallel sockets 9, 9 adapted to be detachably fitted over the free end portion 6' of lever 6 as indicated in dotted lines in Figs. 1 and 2.

The parts being in the position indicated in Fig. 1, and the tool 8 being applied as indicated in dotted lines thereon, the operator grasps the free end of the tool 8 and swings the same in a path transversely of the axis of rim 1 for causing the levers 6 to move from the position indicated in Fig. 1 past the position indicated in dotted lines in Fig. 3 to the position indicated in full lines therein. In approaching this last-named position, that portion of each of the levers 6 between the pivots 5 and 7 would strike the terminal edges of the flanges of rim 1 if provision were not made to accommodate such portions of levers 6. To this end, each of the flanges of rim 1 is formed with a longitudinal, slot-like notch 10, opening at that end of rim 1 to which pivots 5 are connected, and extending along the respective flange a distance sufficient for per portions of lever 6. To this end, each of the the intermediate portion of lever 6. It should be understood, of course, that when the rim 1 is coiled or collapsed to the position seen in Fig. 3, the nesting of the end portions is limited to that extent to which the base of one portion of the rim will enter the channel of the other and that limit is indicated in full lines in Fig. 3, and the notches 10 are limited in their length proportionally.

When the rim has been brought to the position indicated in Fig. 3, it is in condition either to be applied to or removed from the tire shoe or casing with the greatest facility, and after its application to a shoe the rim is restored to its extended condition by swinging the operating tool for bringing the levers 6 to their initial position.

The sockets 9 are sufficiently elongated to prevent accidental slipping thereof away from the free ends 6' of levers 6, but since the result of an accidental slipping of the tool from the levers during operation might be disastrous to the operator means are provided to insure against such accidental dislocation. Such means may assume various forms, but preferably consists of locking bolts carried by the sockets 9 and arranged to detachably engage the free portions of the levers 6. Each of said bolts preferably consists of a threaded shank 11 having the usual winged head 12 at one end and at the other end terminating in a reduced cylindrical extension 13. Each of the winged bolts 11 is threaded through a portion of the respective socket 9 in position for having the smooth, cylindrical reduced portion 13 projected into and withdrawn from an appropriate slot 14 formed in the free end portion of the respective lever 6. Thus by screwing down the bolts 11, after the sockets 9 have been applied to the levers, the engagement between the levers and the operating tool 8 is rendered rigid and free from all possibility of accidental detachment. Upon completion of the manipulation of the rim the bolts 11 are backed off sufficiently to withdraw the extensions 13 from slots 14 and the tool then is free to be withdrawn from engagement with the levers.

I claim:—

1. In a rim structure, the combination of a cross-cut demountable rim and a pair of levers, one arranged outside of each side flange of the rim and each lever pivoted at an intermediate point in its length to the rim adjacent one terminus of the rim and pivoted to an intermediate portion of the rim at one terminus of the lever, each lever having a free portion extending beyond its first-mentioned pivot and the free portion being offset laterally for receiving the socket of an operating tool.

2. In a rim structure, the combination of a cross-cut demountable rim and a pair of levers, one arranged outside of each side flange of the rim and each lever pivoted at an intermediate point in its length to the rim adjacent one terminus of the rim and pivoted to an intermediate portion of the rim at one terminus of the lever, each flange of the rim being formed with a slot-like notch for accommodating the respective lever while the rim portions are moving to and from and are in their collapsed position.

3. In a rim structure, the combination of a cross-cut demountable rim, of a lever pivoted to a side flange of the rim in position for being swung for shifting the rim end portions to and from a collapsed condition, the flange of the rim being formed with a slot-like notch along the path of movement of the lever for accommodating such movement.

In testimony whereof I affix my signature in presence of two witnesses.

LOUIS H. PERLMAN

Witnesses:
E. M. FRUHLING,
EDGAR M. KITCHIN.